United States Patent [19]

Sugiyama et al.

[11] Patent Number: 4,530,013
[45] Date of Patent: Jul. 16, 1985

[54] SPECIAL REPRODUCING SYSTEM FOR REPRODUCING A ROTARY RECORDING MEDIUM

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Yokohama, Japan

[21] Appl. No.: 398,220

[22] Filed: Jul. 14, 1982

[30] Foreign Application Priority Data

Jul. 15, 1981 [JP] Japan .................. 56-110584
Jul. 15, 1981 [JP] Japan .................. 56-110585

[51] Int. Cl.³ ............................................. H04N 5/76
[52] U.S. Cl. .................................... 358/335; 358/342; 358/907; 358/312; 358/313; 369/47
[58] Field of Search ............... 358/312, 313, 335, 342, 358/907; 360/10.1; 369/47

[56] References Cited

U.S. PATENT DOCUMENTS 4,340,907 7/1982 Hirata et al. ................... 369/47 X

FOREIGN PATENT DOCUMENTS

2621995 12/1977 Fed. Rep. of Germany .
2118657 8/1979 Fed. Rep. of Germany .
3039259 5/1981 Fed. Rep. of Germany .
1563680 3/1980 United Kingdom .

Primary Examiner—Robert L. Richardson
Attorney, Agent, or Firm—Louis Bernat

[57] ABSTRACT

A special reproducing system comprises a reproducing element for scanning a spiral track of a rotary recording medium on which an information signal is recorded and a kick control signal is recorded together therewith at a predetermined position, a detecting circuit for detecting the kick control signal from among signals reproduced by the reproducing element, a kick pulse generating circuit for generating a kick pulse in response to the kick control signal detected by the detecting circuit, and a shift mechanism for shifting the reproducing element from a track to another track adjacent thereto in an inner peripheral or outer peripheral direction in response to the kick pulse supplied from the kick pulse generating means, the reproducing stylus is shifted by the shift mechanism to effect a special reproduction.

5 Claims, 14 Drawing Figures

Ans. 5

Ans. 10

Ans. 10

4,530,013

SPECIAL REPRODUCING SYSTEM FOR REPRODUCING A ROTARY RECORDING MEDIUM

BACKGROUND OF THE INVENTION

The present invention generally relates to special reproducing systems for reproducing rotary recording mediums, and more particularly to a special reproducing system for obtaining a special reproduction picture, by recording a signal (kick signal) on the rotary recording medium for performing special reproduction and reproducing at least a part of a plurality of tracks upon reproduction by suitably using the above kick signal.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still picture reproduction, slow-motion reproduction, or quick-motion reproduction becomes possible in a case where the recorded information signal is a video signal.

In order to perform the above special reproduction, a kick pulse is produced by a special reproduction mode control circuit, and this kick pulse is applied to a tracking control coil in a signal pickup reproducing device, to shift the reproducing stylus to an adjacent track. Because the track is formed in a spiral manner, upon still picture reproduction, for example, the reproducing stylus is shifted to an adjacent track in the outer peripheral direction of the disc, once for every revolution of the disc. During slow-motion reproduction, the reproducing stylus is shifted to an adjacent track in the outer peripheral direction of the disc, once for every predetermined number of revolutions over one inclusive of the disc. Further, upon quick-motion reproduction, the reproducing stylus is shifted to a track in the inner peripheral direction of the disc.

Accordingly, the above conventional special reproduction was performed by carrying out still picture reproduction, slow-motion reproduction, and quick-motion reproduction with respect to a part of a program continuously recorded on the tracks formed on the disc.

However, there is now a demand for recording and reproducing various information programs on the disc. Hence, it is highly desirable to realize a new special reproducing system for obtaining special reproduction picture such as a reproduction picture obtained by composing differing recorded information and a reproduction picture obtained by selecting information from among a plurality of recorded information.

SUMMARY OF THE INVENTION

Accordingly, it is a general object of the present invention to provide a novel and useful special reproducing system for reproducing a rotary recording medium, in which the above described demands have been satisfied.

Another and more specific object of the present invention is to provide a special reproducing system for reproducing a rotary recording medium recorded with a kick signal at predetermined positions for shifting the reproducing stylus, to perform special reproduction picture such as a reproduction picture obtained by composing differing recorded information and a reproduction picture obtained by selecting information from among a plurality of differing information recorded on each track. The system according to the present invention is especially effective in reproducing programs for teaching materials, games, and the like.

Other objects and further features of the present invention will be apparent from the following detailed description when read in conjunction with the accompanying drawings.

DETAILED DESCRIPTION

Figure 1:
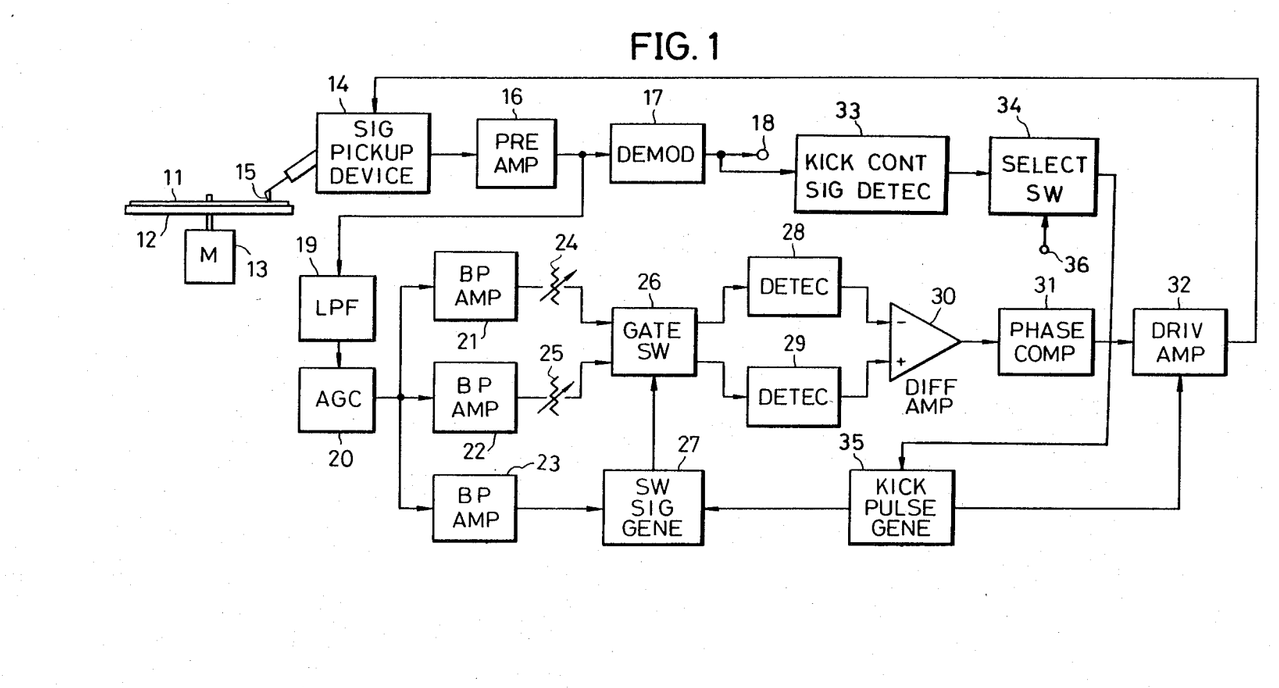
FIG. 1 is a systematic block diagram showing an embodiment of a special reproducing system for reproducing a rotary recording medium according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

Figure 2:
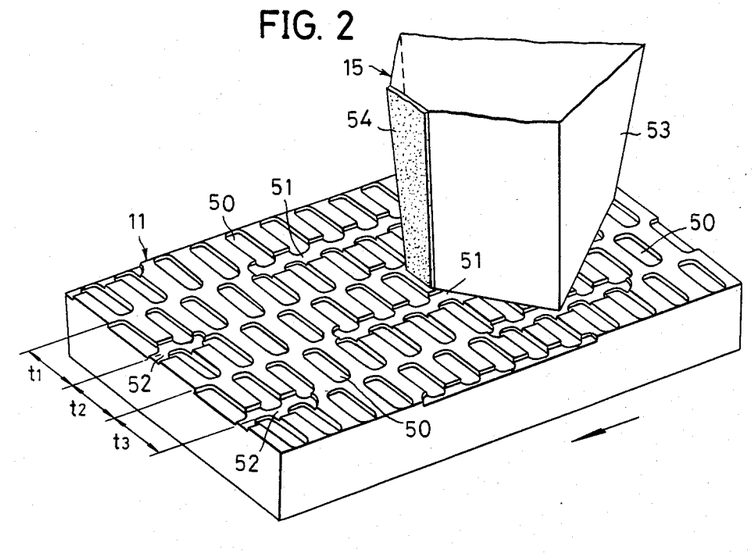
FIG. 2 is a perspective view, in an enlarged scale, showing a part of a rotary recording medium together with a tip end part of a reproducing stylus.

A main information signal comprising a video signal and an audio signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, . . . . . Each track turn is constituted by the formation of pits 50 of a main information signal along a plane track path and has no stylus guide groove formed therein. With respect to one track turn t1, for every interval corresponding to one horizontal scanning period (H) of the video signal, that is, with a frequency interval $f_H$, pits 51 of a first reference signal fp1 are formed on one lateral side of the track as viewed in the track path direction. Pits 52 of a second reference signal fp2 are formed on the other side of the track.

At an intermediate position between the center-lines of adjacent track turns, only pits of either one kind of the pits 51 and 52 of the above reference signals fp1 and fp2 are formed, and moreover, with respect to one track, the sides on which the pits 51 and 52 are formed are alternated for every track turn. That is, if the pits 51 and 52 are respectively formed on the right and left sides of one track turn, for example, the pits 52 and 51 will respectively be formed on the right and left sides of each of the adjacent track turns.

The tip end of the reproducing stylus 15 has a shape shown in FIG. 2. The reproducing stylus 15 is constituted by a stylus structure 53 having a disc tracing surface which has a width greater than a track width, and an electrode 54 fixed to the rear face of the stylus structure 53. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 54 of the reproducing stylus 15.

Figure 3:
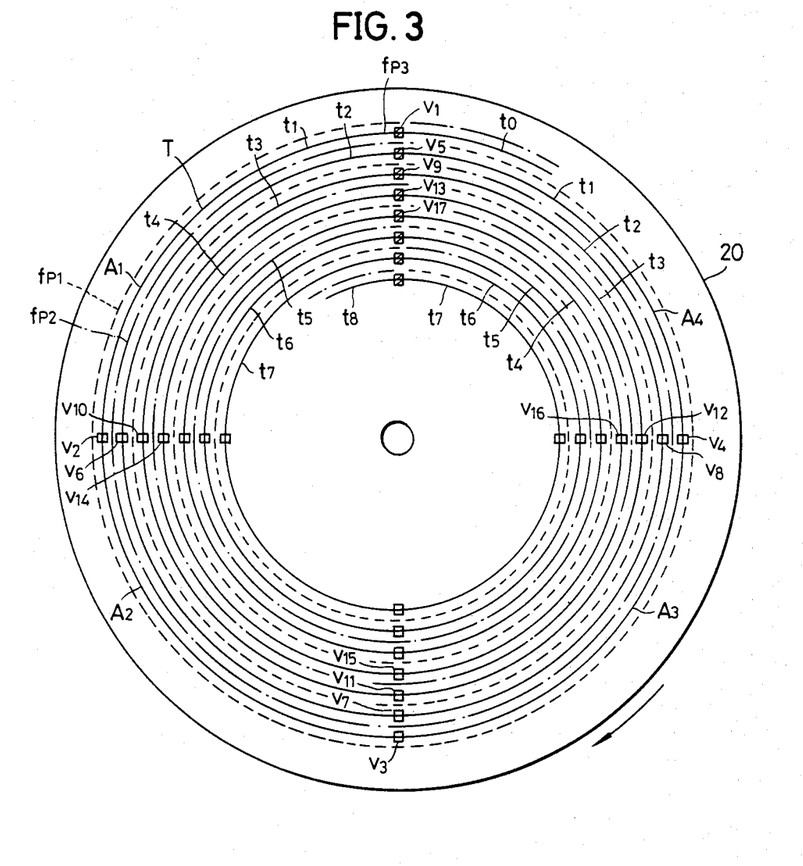
FIG. 3 shows a track pattern on the rotary recording medium.

On the disc 11, as indicated in FIG. 3, the main information signal is recorded along a spiral track T for four fields, for one revolution of the disc. In FIG. 3, the tracks of the first reference signal fp1 is shown by dotted lines while the second reference signal fp2 is shown by one-dot chain lines. The positions of the vertical synchronizing signals of respective fields are designated by reference characters V1, V2, V3, . . . , and the successive track parts corresponding to one revolution of the disc of a single spiral track T is designated by track turns t1, t2, t3, . . . . Furthermore, a third reference signal fp3 is recorded at the starting end positions V1, V5, V9, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original main information signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26. The reference signal fp3 separated and amplified at this bandpass amplifier 23, is supplied to a switching signal generator 27.

The gate switching circuit 26 performs switching of the reference signals fp1 and fp2 every one revolution period of the disc 11 upon normal reproduction, in response to the switching signal generated by the switching signal generator 27 which is applied thereto. Hence, due to the switching signal which reverses polarity every 1/15 seconds, the signals fp1 and fp2 are always alternately supplied to detecting circuits 28 and 29 from the gate switching circuit 26.

The detecting circuits 28 and 29 detect the envelopes of their respective input reference signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal is amplified to a specific level by a driving amplifier 31.

The output signal of the driving amplifier 31 is applied to tracking coils of the signal pickup device 14 as a control signal, to control these tracking coils. Hence, tracking control is performed with respect to the reproducing stylus 15 so that the above tracking error signal becomes zero, that is, so that the reproducing stylus 15 accurately traces over the track T on the disc 11.

A kick control signal is recorded at predetermined positions on the disc 11, as will be described hereinafter. For example, this kick control signal is a burst signal having a frequency of 500 kHz, and is recorded onto the disc be being multiplexed with the video signal and frequency-modulated. The kick control signal comprises four bits. A first bit of the kick control signal indicates whether the kick operation is to be performed. If the first bit is "1" (recorded), the kick operation is performed, and if the first bit is "0" (unrecorded), the kick operation is not performed. A second bit indicates the kicking direction, and "1" indicates the outer peripheral direction of the disc, while "0" indicates the inner peripheral direction of the disc. Third and fourth bits indicate the reproducing mode, and four reproducing modes can be specified by setting these bits to "0,0", "0,1", "1,0", and "1,1". Here, "0,0" indicates a first mode, "0,1" indicates a second mode, and "1,0" indicates a third mode.

Figure 4:
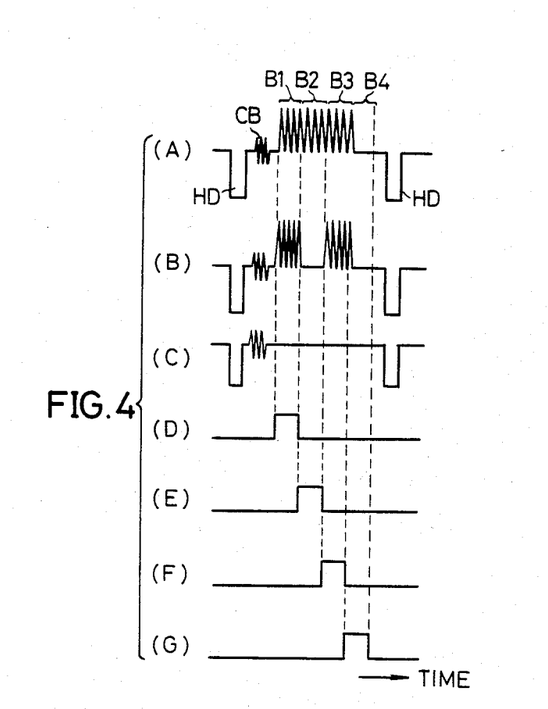
FIGS. 4(A) through 4(G) are graphs respectively showing signal waveforms of a kick control signal recorded on the rotary recording medium and a sampling pulse for detecting the kick control signal.

As shown in FIGS. 4(A) through 4(C), the above kick control signal exists within an interval between horizontal synchronizing signals HD and HD where a color burst signal CB does not exist. In the example shown in FIG. 4(A), a first bit B1 is "1", a second bit B2 is "1", a third bit B3 is "1", and a fourth bit B4 is "0". This means that the kick operation is performed, the kicking direction is in the outer peripheral direction of the disc, and the reproducing mode is in the third mode. Similarly, in the example shown in FIG. 4(B), the four bits are "1,0,1,0", and indicates that the kick operation is performed in the third mode where the kicking direction is in the inner peripheral direction of the disc. Further, in the example shown in FIG. 4(C), the four bits are "0,0,0,0", and indicates that the kick operation is not performed.

The output of the demodulator 17 is supplied to a kick control signal detector 33 wherein the kick control signal demodulated together with the video signal is detected. The detected kick control signal is supplied to a selection switch 34. The selection switch 34 passes and supplies a predetermined kind of kick control signal to a kick pulse generator 35 from among control signals obtained from the detector 33, according to the setting at the selection switch 34. The kick pulse generator 35 generates a kick pulse for performing a kick operation in the inner peripheral direction or the outer peripheral direction of the disc, according to the kind of kick control signal obtained through the selection switch 34. The generated kick pulse is supplied to the tracking control coils of the signal pickup device 14, through a driving amplifier 32. Hence, the reproducing stylus 15 is kicked towards the inner peripheral direction or the outer peripheral direction of the disc and thus shifted to an adjacent track. In addition, the kick pulse from the kick pulse generator 35 is also supplied to the switching signal generator 27, so that a switching signal is generated and supplied to the gate switching circuit 26.

Figure 5:
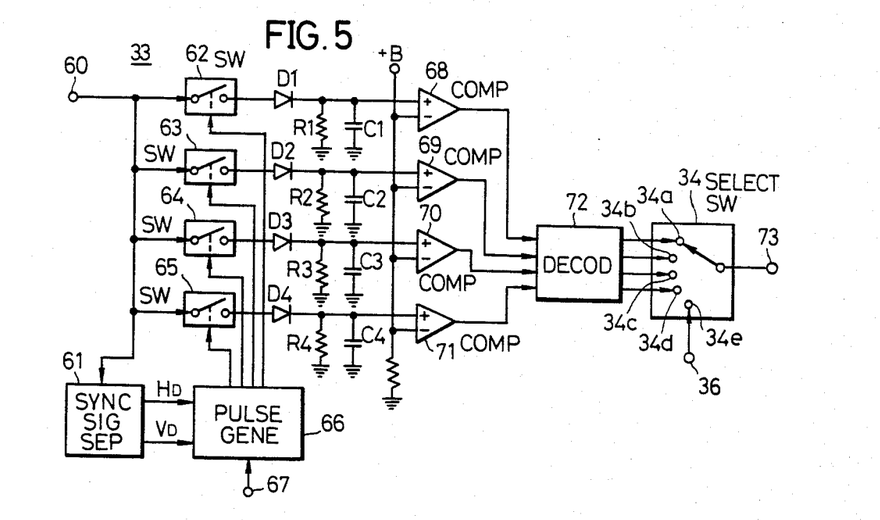
FIG. 5 is a circuit diagram showing an embodiment of a kick control signal detecting circuit in the block system shown in FIG. 1.

An embodiment of a concrete circuit of the above kick control signal detector 33 is shown in FIG. 5. The signal from the demodulator 17, is supplied to a synchronizing signal separation circuit 61 and switches 62 through 65, through a terminal 60. The synchronizing signal separation circuit 61 separates the horizontal synchronizing signal (HD) and the vertical synchronizing signal (VD) from the demodulated video signal, and supplies these signals to a pulse generator 66. The pulse generator 66 generates a sampling pulse shown in FIGS. 4(D) through 4(G), according to the above horizontal and vertical synchronizing signals supplied thereto and a chrominance subcarrier frequency signal (fsc) supplied thereto through a terminal 67. The sampling pulse thus generated by the pulse generator 66 is supplied to the switches 62 through 65.

The switches 62 through 65 are normally open, and close only when the sampling pulse from the pulse generator 66 is of high level. Hence, the first bit of the kick control signal within the signal obtained through the terminal 60, is supplied to a detecting circuit comprising a diode D1, a resistor R1, and a capacitor C1, through the switch 62. The signal thus obtained from this detecting circuit is compared with a threshold voltage at a comparator 68, and a resulting high-level ("1") signal or a low-level ("0") signal is supplied to a decoder 72. Similarly, the second through fourth bits of the kick control signal respectively obtained from the switches 63 through 65, are supplied to corresponding detecting circuits respectively comprising diodes D2 through D4, resistors R2 through R4, and capacitors C2 through C4. Signals from these three detecting circuits are respectively supplied to comparators 69 through 71. The resulting output signals "1" or "0" from the above comparators 69 through 71 are all supplied to the decoder 72. When the signal from the comparator 68 is of high level ("1"), the decoder 72 generates a control signal for kicking the reproducing stylus in the inner peripheral direction of the disc if the signal from the comparator 69 is of low level, and generates a control signal for kicking the reproducing stylus in the outer peripheral direction of the disc if the signal from the comparator 69 is of high level. Further, the decoder 72 supplies the above control signal to a terminal 34a of the selection switch 34 when both the signals from the comparators 70 and 71 are of low levels ("0,0"). Similarly, when the signals from the comparators 70 and 71 are "0,1", "1,0", and "1,1", the decoder 72 supplies the above control signal in accordance with the signals from the comparators 68 and 69, to terminals 34b through 34d.

A setting signal according to the reproducing mode such as normal reproduction, regular still picture reproduction, slow-motion reproduction, quick-motion reproduction, and the like, is supplied to terminal 34e of the selection switch 34 from a terminal 36. A contact of the selection switch is switched and connected to one of the terminals 34a through 34e manually, or automatically by a command from another circuit device. A control signal in accordance with the setting or connection at the selection switch 34, is supplied to the kick pulse generator 35 through a terminal 73. The kick pulse generator 35 accordingly generates a kick pulse having a timing and polarity in accordance with the control signal supplied thereto.

Next, description will be given with respect to a first embodiment of a track pattern on the disc which is reproduced by the above described reproducing apparatus and a reproducing system thereof, by referring to FIG. 6. In the spiral track T shown in FIG. 6, a first program signal is recorded within a 2-field interval between points a and b (a section between the points a and b will hereinafter be referred to as the section ab, and other sections will be referred similarly). A second program signal is recorded in a section bc, and a third program signal is recorded in a section cd. In addition, the first program signal containing the information content continuing to the section ab, is recorded in a section de. Further, the second program signal containing the information content continuing to the section bc is recorded in a section ef, and the third program signal containing the information content continuing to the section cd is recorded in a section fg. Similarly, the first, second, and third program signals are successively recorded in sections following a section gh inclusive. Moreover, a 4-bit kick control signal P1 wherein the bits are "1,0,0,0" (that is, indicating a kick in the inner peripheral direction of the disc in the first mode), is recorded at points b, e, h, . . . on the track T. On the other hand, a 4-bit kick control signal P2 wherein the bits are "1,0,0,1" (that is, indicating a kick in the inner peripheral direction of the disc in the second mode), is recorded at points b', c, f, i, . . . . A 4-bit kick control signal P3 wherein the bits are "1,0,1,0" (that is, indicating a kick in the inner peripheral direction of the disc in the third mode), is recorded at points a, d, g, . . . .

Figure 6:
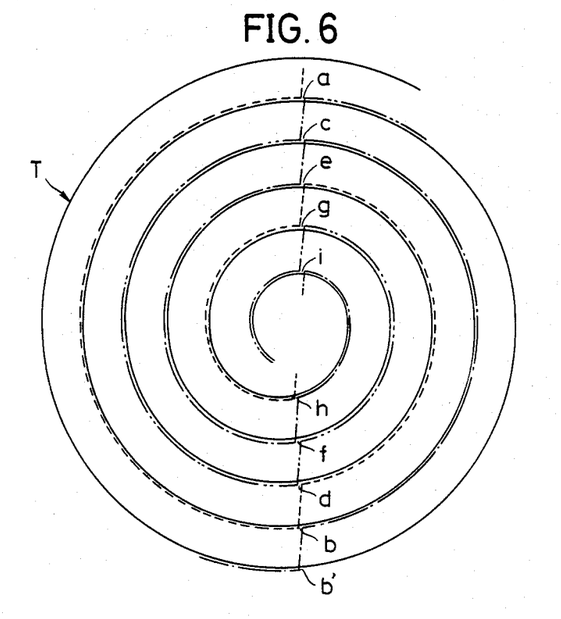
FIG. 6 shows a track pattern for explaining a first embodiment of a recorded program on the rotary recording medium and a reproducing method thereof.

If the disc shown in FIG. 6 is reproduced in a state where the selection switch 34 shown in FIG. 5 is connected to the terminal 34a, the first mode kick control signal P1 obtained from the decoder 72 through the selection switch 34, that is, the kick control signal P1 reproduced at the points b, e, h, . . . in the above example, is supplied to the kick pulse generator 35. The kick control signal of other modes cannot pass through the selection switch 34 even if these signals are reproduced, and therefore are not supplied to the kick pulse generator 35.

When the reproducing stylus 15 successively scans and reproduces the track T to reach the point b by passing the point a and reproducing the first program in the section ab, the first mode kick control signal P1 reproduced from the point b is supplied to the kick pulse generator 35. Accordingly, the kick pulse generator 35 generates a kick pulse for kicking the reproducing stylus towards the inner peripheral direction of the disc. Thus, the reproducing stylus 15 is shifted to an adjacent track in the inner peripheral direction of the disc, at the point b, to scan and reproduce the section de. Similarly, the first mode kick control signal P1 is reproduced at the point e, to shift the reproducing stylus to an adjacent track in the inner peripheral direction of the disc, and further shift the reproducing stylus to a track in the inner peripheral direction of the disc at the point h after scanning and reproducing the section gh. Accordingly, the reproducing stylus 15 scans over a locus indicated by a dotted line in FIG. 6, to continuously reproduce the first program signal.

Similarly, if the selection switch 34 is connected to the terminal 34b, the second mode kick control signal is obtained through the switch 34. Hence, the reproducing stylus 15 is shifted to a track in the inner peripheral direction of the disc at the points b', c, f, i, . . . where the second mode kick control signal is recorded. As a result, the reproducing stylus 15 scans over the sections bc, ef, hi, . . . as indicated by a one-dot chain line in FIG. 6, to continuously reproduce the second program signal.

If the selection switch is connected to the terminal 34c, the third mode kick control signal is obtained through the switch 34. Accordingly, the reproducing stylus 5 is shifted to a track in the inner peripheral direction of the disc at the points a, d, g, . . . where the third mode kick control signal is recorded. Thus, the reproducing stylus 15 scan over the sections cd, fg, . . . as indicated by a two-dot chain line in FIG. 6, to continuously reproduce the third program signal.

Hence, by selectively switching and connecting the selection switch 34 to one of the terminals 34a through 34c, any one of the first, second, and third program signals can be reproduced selectively, in a continuous manner with the reproduction of a track in the outer peripheral direction of the disc with respect to the track where the program signal is recorded.

The above selection switch 34 is not limited to being selectively switched manually. That is, the selection switch 34 may be constructed so that the selection switch 34 is switched and connected to any one of the terminals 34a through 34c at random, by manipulating a single switch or button.

The information content recorded on the above described disc, may be a horse racing game, for example. In this case, the information from the start of the race to an intermediate part of the race is recorded in the tracks on the outer side with respect to the point a. The first, second, and third programs succeeding the above points a, b, and c, respectively contain differing information regarding movements of each horse to the finish and the order of finish. This game is played by betting on a horse which will finish first, before starting of the reproduction or after starting of the reproduction at an intermediate point in the race. The selection switch 34 is set at random, and the program of the mode set by the selective switching is reproduced. Hence, this game is enjoyed by watching the result of the horce race to see whether one guessed right in betting.

Figure 7:
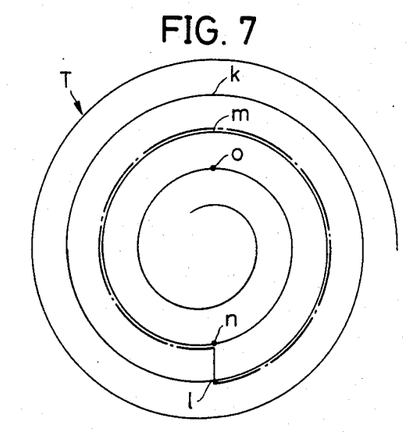
FIG. 7 shows a track pattern for explaining a second embodiment of a recorded program on the rotary recording medium and a reproducing method thereof.
Figure 8A:
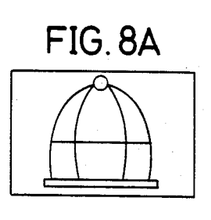
FIGS. 8A, 8B, and 8C respectively are diagrams for explaining pictures reproduced by the reproducing method shown in FIG. 7.
Figure 8B:
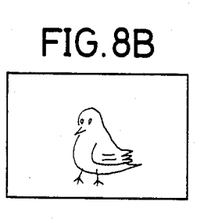

Next, a second embodiment of a track pattern on the disc and a reproducing system thereof, is described in conjunction with FIG. 7. In the spiral track T shown in FIG. 7, a picture information of a bird cage shown in FIG. 8A, for example, is recorded in a section of four fields (one track turn) between points k and m (a section between the points k and m will hereinafter be referred to as a section km, and other sections will be referred similarly). A picture information of a bird shown in FIG. 8B is recorded in a section mo. Furthermore, a 4-bit kick control signal Q1 wherein the bits are "1,1,0,0" (that is, indicating a kick in the outer peripheral direction of the disc in the first mode), is recorded at points m and o. A 4-bit kick control signal Q2 wherein the bits are "1,1,0,1" (that is, indicating a kick in the outer peripheral direction of the disc in the second mode), is recorded at a point n.

Here, when the selection switch 34 shown in FIG. 5 is connected to the terminal 34a, the first mode kick control signal Q1 is permitted to pass through the selection switch 34. Accordingly, when the reproducing stylus 15 scans over an interval between the points k and m and reaches the point m. the first mode kick control signal Q1 is reproduced. Thus, the reproducing stylus 15 is shifted to an adjacent track in the outer peripheral direction of the disc at the point m. As a result, the reproducing stylus 15 repeatedly reproduces a section km, and a still picture of the bird cage shown in FIG. 8A is reproduced. Then, if the selection switch 34 is once connected to the terminal 34e, the kick control signal Q1 reproduced from the point m is prevented from passing through the selection switch 34 by a signal from the terminal 36. In this case, the reproducing stylus 15 passes the point m without being shifted. Thereafter, when the selection switch 34 is again connected to the terminal 34a, the reproducing stylus 15 scans over a section mo, and the kick control signal Q1 is reproduced when the reproducing stylus 15 reaches the point o. The reproducing stylus 15 is thus shifted to an adjacent track in the outer peripheral direction of the disc, and again reproduces the section mo. Then, the scanning and reproduction of the section mo is repeatedly performed, and the picture of the bird shown in FIG. 8B is accordingly reproduced.

Next, when the selection switch 34 is connected to the terminal 34b, a second mode kick control signal Q2 passes through the selection switch 34. Hence, as the reproducing stylus 15 scans over a section mn and reaches the point n, the kick control signal Q2 reproduced from the point n passes through the selection switch 34. As a result, the reproducing stylus 15 is shifted to an adjacent track in the outer peripheral direction of the disc at the point n. When the section mn is scanned and reproduced and the reproducing stylus 15 reaches the point m, the scanning by the reproducing stylus 15 continues because the first mode kick control signal Q1 does not pass through the selection switch 34.

Figure 8C:
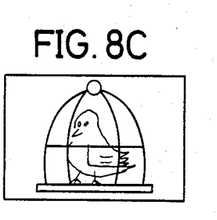

Thereafter, the above described operation is repeated, and a section lmn is repeatedly scanned by the reproducing stylus 15. The information containing the bird cage and the information containing the bird is thus alternately reproduced from the sections lm and mn, respectively. Therefore, a resulting picture shown in FIG. 8C is obtained, wherein the bird appears to be in the cage.

Next, description will be given with respect to a third embodiment of a track pattern on the disc and a reproducing system thereof, by referring to FIG. 9. In the spiral track T shown in FIG. 9, the same information shown in FIG. 10A, for example, is recorded in each field of a section between points r1 and q1 comprising four fields (one track turn). In FIG. 10A, a picture of one field comprises an information of a mathematics problem in the upper half thereof and information of an answer to a mathematics problem recorded in a track turn (not shown) preceding the point q1 in the lower half thereof. In addition, the same information shown in FIG. 10B is recorded in each field of a section between points r1 and s1 comprising four fields. In FIG. 10B, the upper half of the picture contains another mathematics problem, and the lower half contains an answer to the mathematics problem shown in FIG. 10A.

In the above section q1r1, a 2-bit kick control signal S1 wherein the bits are "1,0" (that is, indicating a kick in the inner peripheral direction of the disc), is recorded at points q2, q4, q6, and q8. On the other hand, a 2-bit kick control signal S2 wherein the bits are "1,1" (that is, indicating a kick in the outer peripheral direction of the disc), is recorded at points r1, r3, r5, r7, and s1, in a section r1s1.

When reproducing the above disc, the selection switch 34 is constructed to switch over and simply pass both the kick control signals S1 and S2, or pass the kick control signal S2 from the points r1 and s1. When the selection switch 34 is connected to pass the kick control signal S2 from the points r1 and s1, the reproducing stylus 15 scans over and reproduces a section q1r1 between the points q1 and r1. The kick control signal S2 is supplied to the kick pulse generator 35 when the reproducing stylus 15 reaches the point r1, and the reproducing stylus 15 is accordingly shifted to a track in the outer peripheral direction of the disc to again reproduce the point q1. Thus, the section q1r1 is repeatedly reproduced, and the picture shown in FIG. 10A is reproduced. Next, after answering the problem in FIG. 10A, a pulse is supplied to the terminal 36 once, to interrupt the kick control signal S2 reproduced from the point r1 from passing through the selection switch 34. By this interruption of the kick control signal S2, the reproducing stylus 15 passes by the point r1, and advances to reproduce the succeeding track turn. Similarly, when the reproducing stylus 15 reproduces the kick control signal S2 at the point s1, the reproducing stylus 15 is shifted to the point r1 from point s1. As a result, a section r1s1 is repeatedly reproduced, that is, the picture shown in FIG. 10B is reproduced. By monitoring the picture shown in FIG. 10B, the operator visually checks whether the answer to the preceding problem is correct or not. Next, the problem in the same picture shown in FIG. 10B is solved. Thereafter, similar operations are performed.

Here, there are cases where it is desirable to simultaneously display the problem and the answer to this problem in the same picture. In such a case, the selection switch is switched over to pass both the kick control signals S1 and S2. When the reproducing stylus 15 starts scanning from the point q1 and reaches the point q2 in this state, the first kick control signal S1 is reproduced. Accordingly, the reproducing stylus 15 is shifted to a track in the inner peripheral direction of the disc, to scan over a section r2r3. When the reproducing stylus 15 reaches the point r3, the second kick control signal S2 is reproduced. As a result, the reproducing stylus 15 is shifted to a track in the outer peripheral direction of the disc to reproduce a section q3q4. Thereafter, the reproducing stylus 15 is similarly shifted to a track in the inner peripheral direction of the disc at the points q4, q6, and q8, and shifted to a track in the outer peripheral direction at the points r5, r7, s1, and r1. Therefore, the reproducing stylus 15 repeatedly scans and reproduces the sections q1q2, r2r3, q3q4, r4r5, q5q6, r6r7, q7q8, and r8s1 in this order.

Figure 10A:
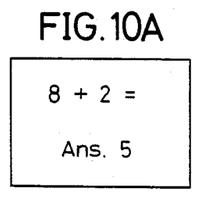
FIGS. 10A, 10B, and 10C respectively are diagrams for explaining pictures reproduced by the reproducing method shown in FIG. 9.
Figure 10B:
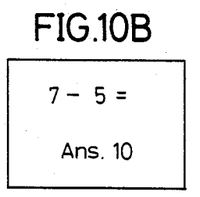
Figure 10C:
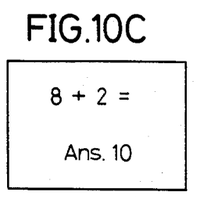

Because the sections q1q2, q3q4, q5q6, and q7q8 respectively correspond to the first half of each field in FIG. 10A, only the upper half of the picture, that is, the part showing a problem, shown in FIG. 10A is reproduced. On the other hand, since the sections r2r3, r4r5, r6r7, and r8s1 respectively correspond to the second half of each field in FIG. 10B, only the lower half of the picture, that is, the part showing an answer, shown in FIG. 10B is reproduced. Accordingly, the problem and the answer to the problem are composed and displayed simultaneously in the same picture as shown in FIG. 10C, by alternately shifting the reproducing stylus 15 for every ½ field when reproducing the two track turns as described above.

The reproducing stylus is not limited to being alternately shifted to two tracks, and may be shifted to three or more tracks. In such a case, a composed picture is obtained wherein three or more parts of the picture is obtained from the three or more tracks.

Figure 9:
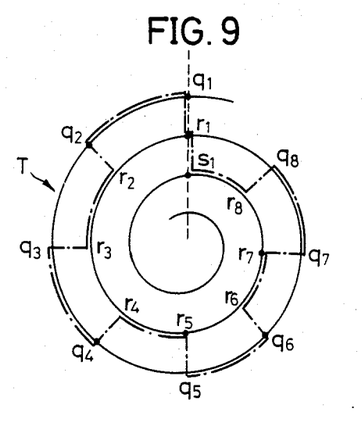
FIG. 9 shows a track pattern for explaining a third embodiment of a recorded program on the rotary recording medium and a reproducing method thereof.

At the points a through i in FIG. 6, the points k through o in FIG. 7, and the points q1, q3, q5, q7, r1, r3, r5, r7, and s1 in FIG. 9, the kick control signal exists within the nineteenth horizontal scanning period in the vertical blanking period, for example. Thus, undesirable effects are not introduced in the reproduced picture. At the points q2, q4, q6, q8, r2, r4, r6, r8, . . . in FIG. 9, the kick control signal exists within a horizontal scanning period at the center of one field, and the reproducing stylus is shifted at these points. Hence, in this case, noise corresponding to one scanning line is introduced in the middle of the picture in FIG. 10C. However, this noise is negligible from the practical point of view.

Further, the present invention is not limited to these embodiments, but various variations and modifications may be made without departing from the scope of the present invention.

What is claimed is:

1. A special reproducing system comprising:

a reproducing element for scanning a spiral track on a rotary recording medium; said spiral track being made up of a plurality of successive track turns; said rotary recording medium having kick control signals recorded thereon, reference signals for providing tracking control, and video signals including vertical synchronizing signals; said kick control signals containing a plurality of different kinds of kick control information including information indicating whether or not said reproducing element is to be shifted and a shifting direction for said reproducing element, at least one of said kick control signals being recorded in each track turn; said reproducing element reproducing the recorded signals from the track turns on said rotary recording medium;

detecting means responsive to the signals reproduced by said reproducing element for detecting the kick control signals from among the signals reproduced by said reproducing element;

selecting means responsive to the kick control signals detected by said detecting means for selectively deriving a kick control signal containing a predetermined kind of kick control information from the kick control signals detected by said detecting means;

kick pulse generating means responsive to the kick control signal derived by said selecting means for generating a kick pulse in response to the kick control signal derived by said selecting means; and shift means responsive to the kick pulse supplied from the kick pulse generating means for shifting the reproducing element from one track to another track which is adjacent thereto with the shifting being in either an inner peripheral or an outer peripheral direction, said reproducing element being shifted by said shift means to carry out a special reproduction.

2. A special reproducing system as claimed in claim 1 in which said kick control information contained in said kick control signals includes mode information for indicating a mode in which the reproducing element is shifted to scan portions of the track turns selected responsive to said mode.

3. A special reproducing system as claimed in claim 1 in which said rotary recording medium has the recorded video signals relating to programs of different kinds for each of a plurality of predetermined intervals being recorded in each track turn, and a kick control signal recorded at the end of each predetermined interval so that a kick pulse is generated whereby the reproducing element scans over and continuously reproduces only track portions having the recorded video signal relating to a program of a kind selected from among the different kinds of programs, the video signal relating to the program of the kind corresponding to the kick control signal of the kind selected by the selecting means being reproduced.

4. A special reproducing system as claimed in claim 1 in which said rotary recording medium has the recorded video signals relating to programs of different kinds recorded on each track turn and a kick control signal recorded at an intermediate position in each track turn, and said selecting means selectively passing or not passing the kick control signal detected by the detecting means, said video signals relating to programs of different kinds being reproduced to obtain a composite reproduction picture for every revolution of the rotary recording medium when the detected kick control signal is passed by the selecting means.

5. A special reproducing system as claimed in claim 1 in which said rotary recording medium has the recorded video signals which are related to different kinds of programs, a plurality of fields being recorded in each track turn and a kick control signal recorded at an intermediate position in each field in each track turn, and said selecting means selectively passing or not passing the kick control signal detected by the detecting means, said video signals relating to programs of different kinds being reproduced in each field interval for every revolution of the rotary recording medium to obtain a composite reproduction picture when the detected kick control signal is passed by the selecting means.

* * * * *